United States Patent
Cheung (10) Patent No.: US 8,522,672 B2
(45) Date of Patent: Sep. 3, 2013

(54) FOOD COOKING OVEN

(76) Inventor: Chun Kong Ian Cheung, Hong Kong (CH)

( * ) Notice: Subject to any disclaimer, the term of this patent is extended or adjusted under 35 U.S.C. 154(b) by 189 days.

(21) Appl. No.: 12/989,442

(22) PCT Filed: Apr. 29, 2009

(86) PCT No.: PCT/CN2009/000471
§ 371 (c)(1),
(2), (4) Date: Dec. 13, 2010

(87) PCT Pub. No.: WO2009/132522
PCT Pub. Date: Nov. 5, 2009

(65) Prior Publication Data
US 2011/0120318 A1    May 26, 2011

(30) Foreign Application Priority Data
Apr. 29, 2008  (HK) .................................. 08104757

(51) Int. Cl.
*A47J 27/62*  (2006.01)
*A47J 37/06*  (2006.01)

(52) U.S. Cl.
USPC .......................................................... 99/331

(58) Field of Classification Search
USPC ................... 219/338, 413, 497; 99/391, 386, 99/389, 393, 443 C
See application file for complete search history.

(56) References Cited

U.S. PATENT DOCUMENTS

| | | | |
|---|---|---|---|
| 4,244,284 A | 1/1981 | Flavan, Jr. et al. | |
| 4,289,064 A * | 9/1981 | Rosenblatt | 99/334 |
| 4,382,403 A | 5/1983 | Tokayer | |
| 5,821,503 A * | 10/1998 | Witt | 219/388 |
| 7,036,426 B2 | 5/2006 | Cheung | |
| 2006/0254430 A1 | 11/2006 | Nevarez et al. | |

FOREIGN PATENT DOCUMENTS

JP    2007-232281 A    9/2007

OTHER PUBLICATIONS

European Patent Office, Extended European Search Report in European Patent Application No. 09737633.9, (Sep. 26, 2012).

* cited by examiner

*Primary Examiner* — Henry Yuen
*Assistant Examiner* — Thomas Ward
(74) *Attorney, Agent, or Firm* — Leydig, Voit & Mayer, Ltd.

(57) ABSTRACT

A food cooking oven includes a cooking chamber, two heaters located in the cooking chamber for cooking food in the chamber, and a control circuit for controlling operation of the heaters, individually, in terms of at least one of time of operation and power supplied to the heaters. A conveyor in the cooking chamber conveys food successively past the heaters for cooking. Also included is a user control device for entering a cooking control signal of the control circuit to control the operation of the heaters as the conveyor conveys food past the heaters, thereby determining how the food is cooked.

12 Claims, 14 Drawing Sheets

FOOD COOKING OVEN

The present invention relates to an oven for cooking food. More particularly, although not exclusively, the invention relates to an oven for cooking rotating chicken pieces or other food items, such as sausages, at commercial premises.

BACKGROUND OF THE INVENTION

It is known to cook food articles on a rotating skewer. Such skewers may be driven within an oven space or adjacent to a radiating heat source to rotate about a fixed axis. After a preset or estimated cooking time, the food article and/or skewer may be manually removed or automatically unloaded.

In a known arrangement, the food articles are moved slowly past an adjacent radiating heat source in a heater zone or cooking chamber along a predetermined path, preferably but not necessarily being rotated at the same time, for cooking while the food articles are travelling in the heater zone. The food articles are loaded before reaching an entrance of the heater zone and later unloaded upon coming out of an exit thereof. The speed of movement is often fixed, and so is the intensity of the heat source.

Due to differences in the nature of food articles being cooked and/or personal preference, the degree of the food articles are done are often not satisfactory. For example, if continued cooking occurs, the food articles can dry out and lose its succulence hence becoming unappetizing or even unpalatable.

OBJECT OF THE INVENTION

It is an object of the present invention to overcome or substantially ameliorate at least one of the above disadvantages or shortcomings.

It is an object of the present invention to provide a food cooking oven for food articles, which is capable of cooking food articles of good succulence and palatability.

SUMMARY OF THE INVENTION

According to the invention, there is provided a food cooking oven comprising a cooking chamber, at least two heaters located in the cooking chamber for cooking food in the cooking chamber, and a control circuit for controlling individual operation of the heaters in terms of at least one of time of operation and power of operation. A conveyor is provided in the cooking chamber for conveying food successively past the heaters for cooking thereby. Also included is a user control device allowing a user to enter a cooking control signal for the control circuit to control the operation of the heaters as the conveyer conveys food past the heaters, thereby determining how said food is cooked.

Preferably, the conveyer is constructed to convey a series of pieces of food successively past the heaters, and the control circuit is configured to control the operation of the heaters successively in accordance with a said cooking signal from the user control device as a piece of food is conveyed close to each of the heaters.

More preferably, the control circuit operatively controls the operation of a first heater and then a second heater of the heaters as a piece of food is conveyed close to the heaters successively, in accordance with a said cooking signal from the user control device.

Further more preferably, the control circuit operatively controls the individual operation of the heaters at a power of operation determined by a said cooking signal from the user control device.

Further more preferably, the control circuit operatively controls the individual operation of the heaters at a time of operation determined by when a piece of food is conveyed close to the relevant heater.

In a preferred embodiment, the control circuit includes a temperature sensor to sense temperature in the cooking chamber for use in determining a power of operation for the heaters in accordance with a said cooking signal from the user control device.

In a preferred embodiment, the food cooking oven includes a trigger which associates the operations of the conveyor and the control circuit such that the operations are synchronized.

More preferably, the trigger is part of the conveyer, which is movable from a non-operating position to an operating position for starting the operation of the conveyer.

Further more preferably, the trigger is arranged to switch on the conveyer and at the same time to load the conveyer with a piece of food.

It is preferred that the user control device comprises at least one switch for providing a plurality of cooking control signals.

It is further preferred that the user control device comprises a plurality of said switches, each of which is associated with a respective cooking control signal.

In a preferred embodiment, the conveyer comprises a plurality of food holders each for holding a piece of food, and the food holders are supported for rotation in the cooking chamber successively past the heaters.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Referring initially to FIGS. 1 to 5 of the drawings, there is shown a food cooking oven embodying the invention, in the form of a rotisserie oven 10 which is designed to cook food items 9 in a continuous manner and for a variety of food, such as chicken wings 9 supported on a bamboo skewer as referred to below, or sausages or fish/meat balls, etc. Different food items 9 may be loaded into the oven 10 for cooking in any order and at any time. Different types of food require different cooking temperatures and degrees of cooking, and naturally personal preference is another factor.

Figure 1:
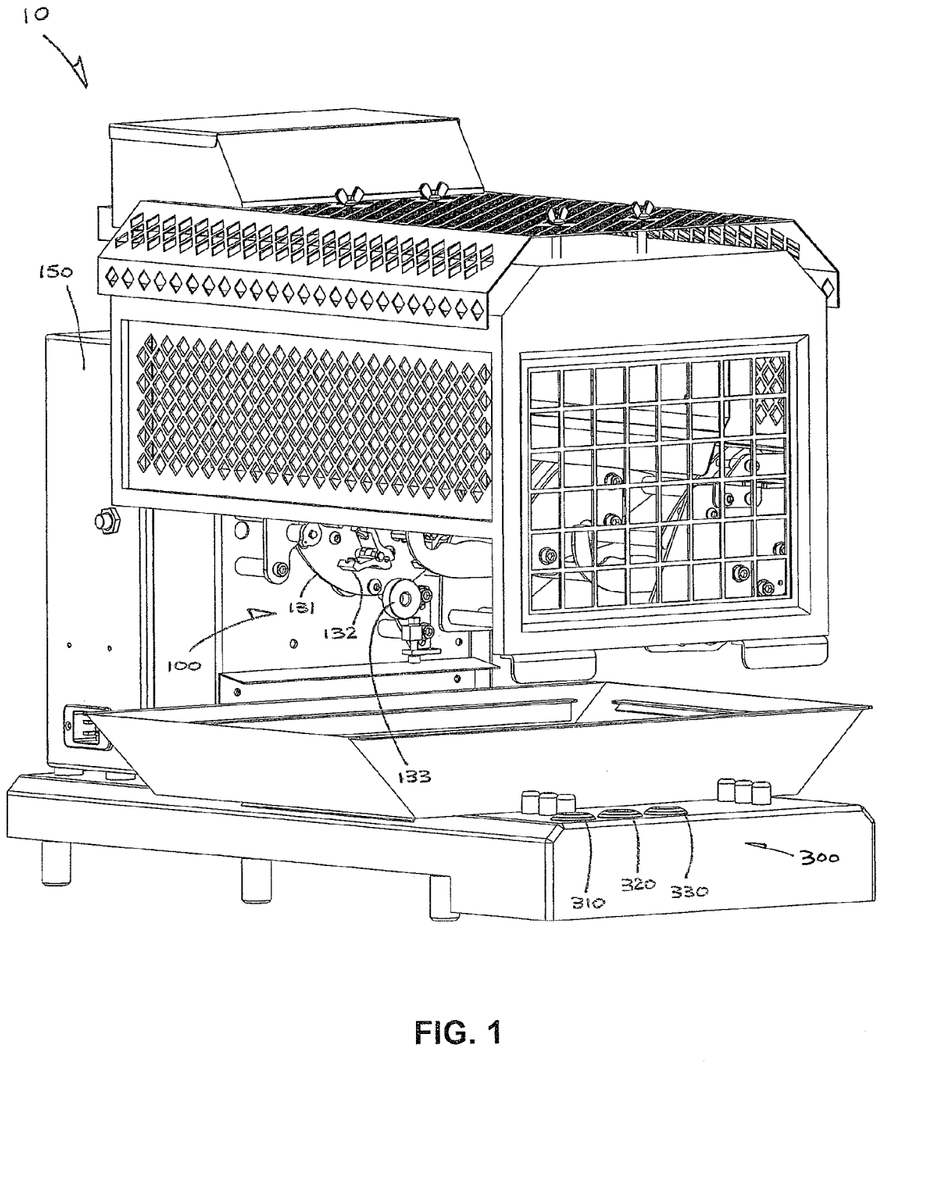
FIG. 1 is a front and side perspective view of an embodiment of a food cooking oven in accordance with the invention.
Figure 2:
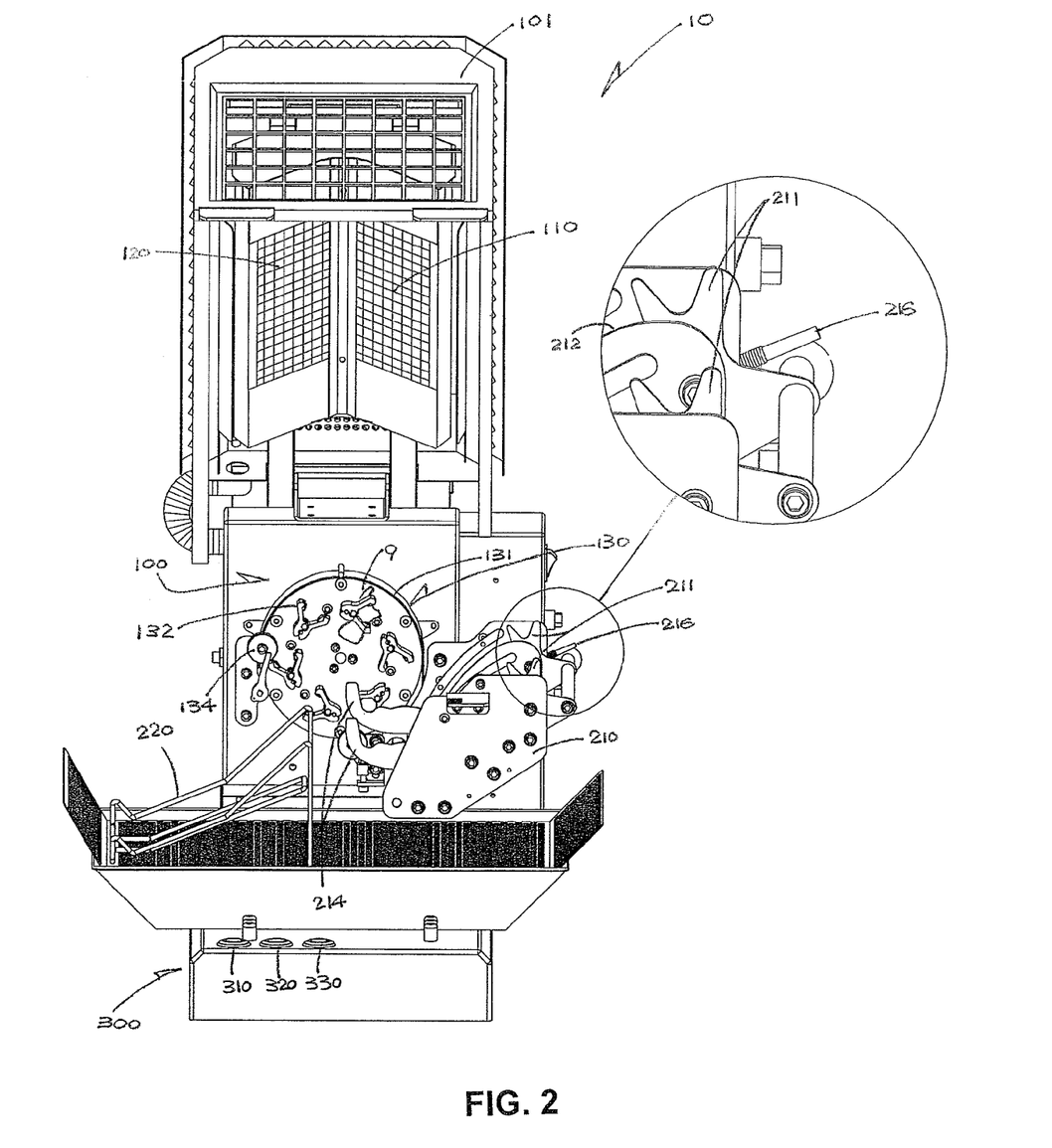
FIG. 2 is a front perspective view of the oven of FIG. 1, with a cover thereof opened and certain parts inside at the front removed.
Figure 3:
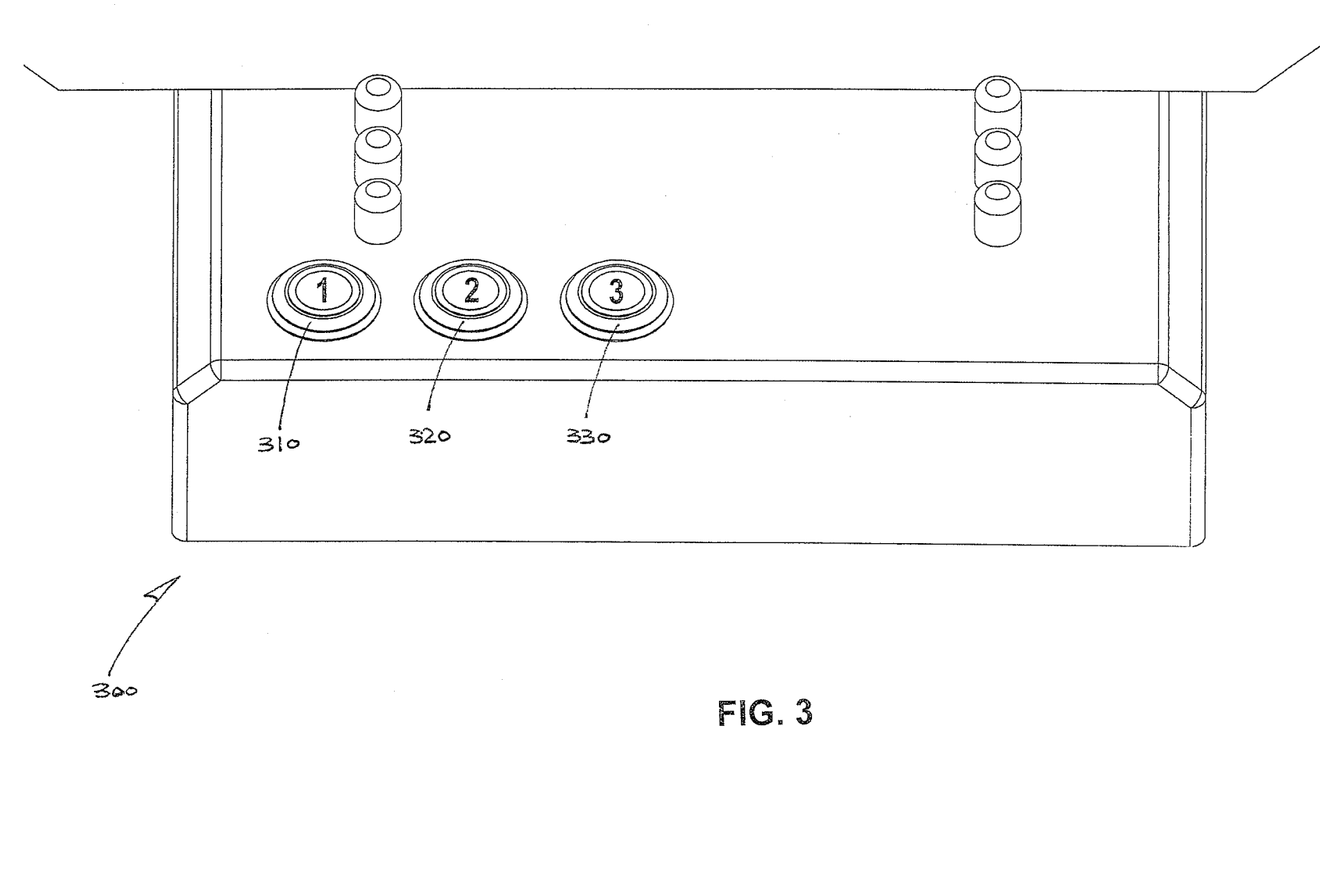
FIG. 3 is a perspective view of a user control device of the oven of FIG. 2.

The oven 10 has a cooking chamber 100, a pair of electrical heaters 110 and 120 located in the chamber 100 for roasting food in the chamber 100, a heater control circuit 400 for controlling individual operation of the heaters 110 and 120, and a conveyor 130 provided in the chamber 100 for conveying food items 9 successively past the heaters 110 and 120 for roasting thereby. Also included is a user control device 300 which allows a user to enter a cooking control signal for the control circuit 400 to control the operation of the heaters 110 and 120 as the conveyer 130 conveys the food items 9 past the heaters 110 and 120, thereby providing an appropriate cooking power to suit the kind of food items 9 intended and/or determining how they are cooked.

The cooking chamber 100 has an entrance on the right side as shown where a feeding station 210 is installed for feeding raw chicken wings 9 into the chamber 100, and an exit on the left side where a slider 220 is provided for collecting cooked chicken wings 9 leaving the chamber 100.

The conveyer 130 is formed by a pair of front and rear vertical discs 131 (only the rear disc is shown in FIG. 2) which are driven by a drive mechanism to rotate in tandem, anticlockwise as shown, about a horizontal axis. The drive mechanism incorporates an electric motor, an operating circuit for controlling the motor, and a gear train for transmitting drive from the motor to the conveyor discs 131 and any other driven parts. The drive mechanism is located inside a compartment 150 immediately behind the cooking chamber 100.

Each of discs 131 bears, on the inner surface thereof, an annular series of six (for example) clamps or pegs 132 which are aligned with respective pegs 132 of the opposite disc 131 to form six aligned pairs, each being spring-loaded for holding a chicken wing 9 by clamping at the opposite ends of its associated skewer. Upon rotation, the discs 131 turn the chicken wings 9 held by the pegs 132 along a vertical circular path as in the case of a Ferris wheel.

All the pegs 132 are mounted on individual gearwheels in drive engagement with the aforesaid gear train for simultaneous rotation about respective horizontal axes, such that as the pegs 132 are turned by the conveyor discs 131 they also rotate about their own axes, as in the case of planetary motion.

The conveyer 130 is designed to convey a series of food in piece form, e.g. the chicken wings 9, through the cooking chamber 100 from its entrance to its exit, and while inside the chamber 100 successively past the heaters 110 and 120 one after the other for roasting thereby. The chicken wings 9 are turned by the conveyor discs 13 and at the same time rotated about their own axes by the pegs 132, such that each chicken wing 9 can achieve cooking around as evenly as that is possible.

The heaters 110 and 120 are mounted on the underside of a top cover 101 which is hinged for pivoting upwards to reveal the interior of the cooking chamber 100 for cleaning or maintenance, etc. Side-by-side on the underside of the top cover 101, the heaters 110 and 120 are arranged to face generally downwards immediately above the conveyer 130 for radiating heat upon the two to three upper chicken wings 9 which are being turned by the conveyer 130 to the upper part of the aforesaid circular path, successively past the heaters 110 and 120.

The six pairs of pegs 132 are arranged symmetrically (i.e. at 60° apart) around the axis of rotation of conveyer 130. The two heaters 110 and 120 are flat and inclined at approximately 120° with respect to each other, and hence their normals at roughly 60° about the axis of rotation. With this arrangement, the heaters 110 and 120 are alignable angularly with any two adjacent chicken wings 9. This makes it possible that while the second (downstream) heater 120 is roasting one chicken wing 9, the first (upstream) heater 110 can cook the next chicken wing 9 that follows immediately behind.

A fixed roller 133 is located inside the chamber entrance adjacent the feeding station 210 and each conveyor disc 131 for bearing by one leg of a peg 132 turned thereto by the disc 131 such that the peg 132 is nudged momentarily open to receive and clamp a chicken wing 9 just fed in by the corresponding end of its associated skewer. Another fixed roller 134 is provided adjacent the exit slider 220 and each conveyor disc 131 for bearing by one leg of the same peg 132 turned thereto by the disc 131 later such that the peg 132 is nudged momentarily open to release the chicken wing 9, which has just been cooked.

The feeding station 210 incorporates a pair of aligned vertical fork plates 211 hinged for limited pivotal movement about a horizontal axis. The fork plates 211 are spring-loaded to face normally upwards for holding a chicken wing 9 by the opposite ends of its supporting skewer at the entrance of the cooking chamber 100. An electrical toggle switch 215 is located within a lower part of the fork plates 211, having an operating lever 216 which is coupled with the fork plates 211 for simultaneous pivotal movement.

The toggle switch 215 is electrically connected to the heater control circuit 400 and to the operating circuit for the drive mechanism driving the conveyer 130, for synchronizing the related operations, and in particular between the conveyer 130 and the heaters 110 and 120 such that the heaters 110 and 120 will start successively as and when a specific food article is brought by the conveyer 130 close to the heaters 110 and 120 one following the other.

Figure 4A:
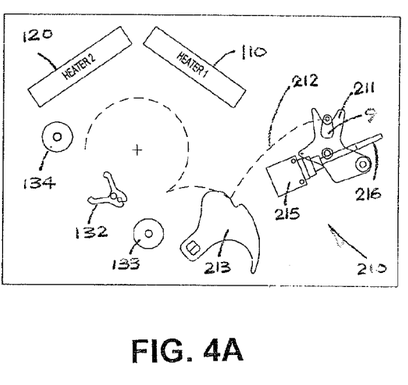
FIGS. 4A to 4J are sequential schematic diagrams that illustrate how food is conveyed and cooked inside the oven of FIG. 1.
Figure 4B:
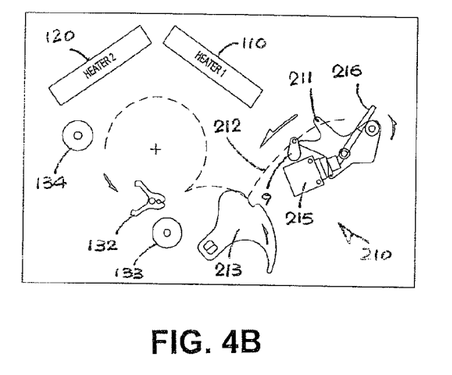
Figure 4C:
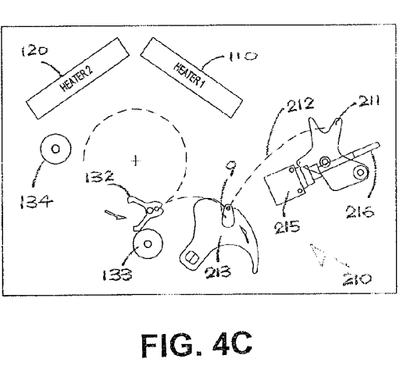

The toggle switch 215 is normally open, with its lever 216 arranged for flipping upwards by a user so as to close the switch itself and, at the same time, to tilt the fork plates 211 towards the chamber 100 and hence unload the chicken wing 9 thereon into the chamber 100 along a pair of guide rails 212 (FIG. 4B). The switch 215 upon closing triggers start of operation of the conveyer 130 and the heater control circuit 400.

Figure 4D:
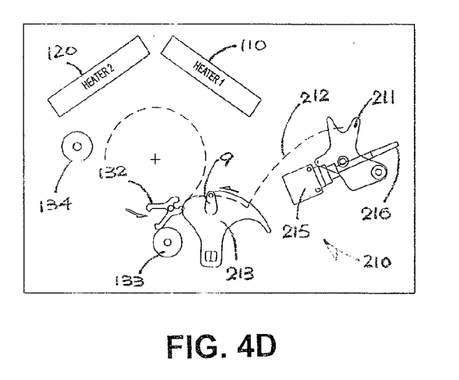

At the bottom ends of the guide rails 212, there is a pair of turn plates 213 each having a notch for receiving and holding the chicken wing 9 by the opposite ends of its skewer (FIG. 4C) and then turning it onwards to a pair of pegs 132 which are being turned upwards by the conveyer 130 and nudged open by the first pair of rollers 133 (FIG. 4D).

Figure 4E:
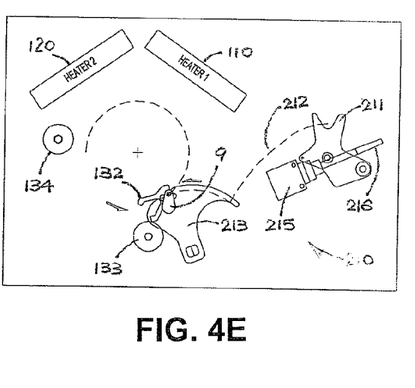
Figure 4F:
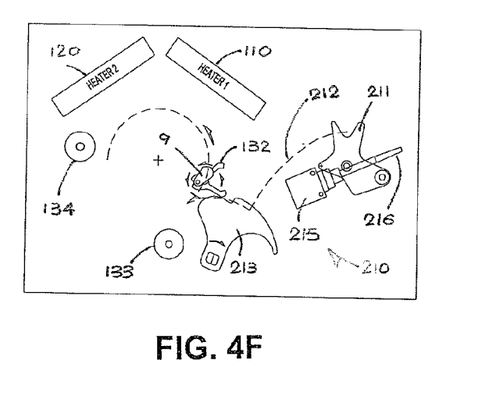
Figure 4G:
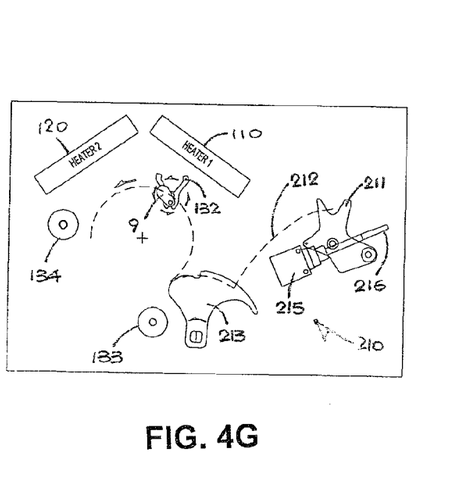
Figure 4H:
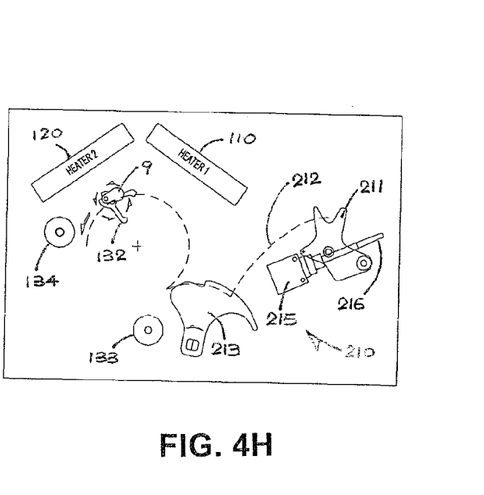
Figure 4I:
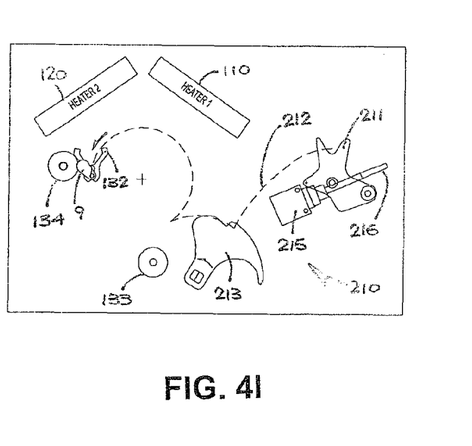
Figure 4J:
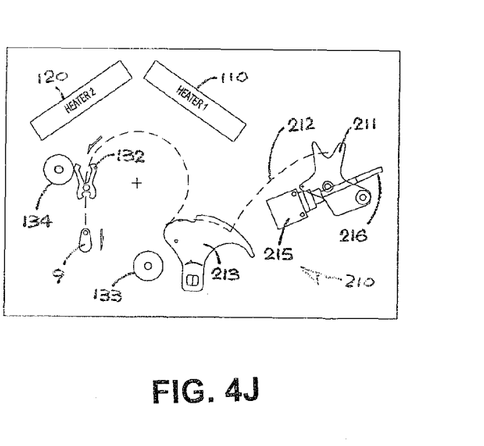

The chicken wing 9 is held and picked up by the pegs 132 (FIGS. 4E and 4F). The pegs 132 will then be turned further upwards, while being simultaneously rotated about their own axis, past the first heater 110 (FIG. 4G) and then the second heater 120 (FIG. 4H). As a result, the chicken wing 9 will be roasted on all sides by the heaters 110 and 120 as it is being moved in planetary motion. Finally, the pegs 132 are nudged open by the other pair of rollers 134 to let go the chicken wing 9 (FIGS. 4I and 4J), which will then fall onto and thus be collected by the slider 220 at the exit of the cooking chamber 100.

Depending primarily on the types of food that the rotisserie oven 10 is designed for, the heaters 110 and 120 are built to provide a cooking temperature in the range from 500° C. to 700° C. adjustable in 15 to 50 levels, and the cooking time is preset to be within 2.0 to 3.5 minutes. To this end, the speed of operation i.e. movement of the conveyer 130 is generally fixed for simplicity of control, though this can be changed or programmed within a small range or several values for finer control.

To adjust the cooking temperature, or degree of cooking, for different types of food and/or personal preference, the operation of the heaters 110 and 120 is controlled by using the user control device 300 via the heater control circuit 400. The user control device 300 is implemented by a series of three control buttons 310, 320 and 330 arranged in front of the cooking chamber 100, which are designated for low, medium and high degrees of cooking respectively, i.e. cooking temperature and/or time.

Each of the buttons 310 to 330 incorporates a pushbutton switch for depression to issue an electrical cooking control signal to select an appropriate cooking power for the food concerned or as desired. Based on the cooking signal, the heater control circuit 400 controls the individual operation of the heaters 110 and 120 successively as the relevant food item 9 is conveyed close to the heaters 110 and 120 one after the other.

It is noted that the operation of the heaters 110 and 120 is controllable in terms of time of operation and/or power of operation.

Reference is also made to FIGS. 5 to 13. The heater control circuit 400 is built by a mains power supply circuit 410 for converting the mains supply voltage of 180-240V AC into a 38V DC voltage, an output chopper circuit 440 connecting and controlling the output of the mains power supply circuit 410 to each of the heaters 110 and 120, and an interface circuit 420 with an MCU circuit 430 for controlling the operation of the output chopper circuit 440. The interface circuit 420 serves to collect a cooking control signal from the buttons 310 to 330 as well as an output signal of a thermocouple 102 in the cooking chamber 100, and based on such parameters the MCU circuit 430, or MCU U1 thereon, is programmed to determine how the heaters 100 and 120 are energized.

Figure 5:
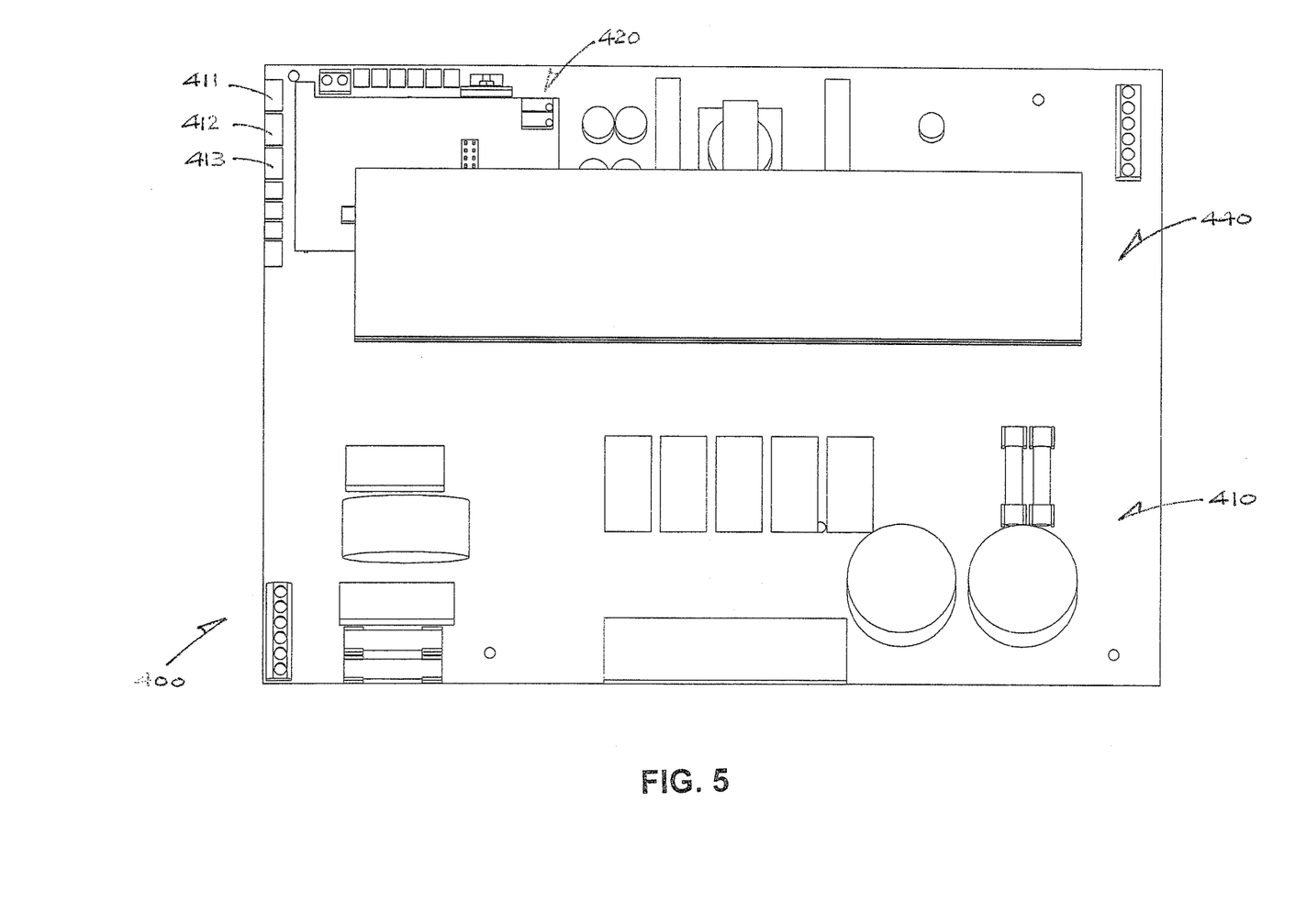
FIG. 5 is a schematic top view of a control circuit of the oven of FIG. 1.
Figure 6:
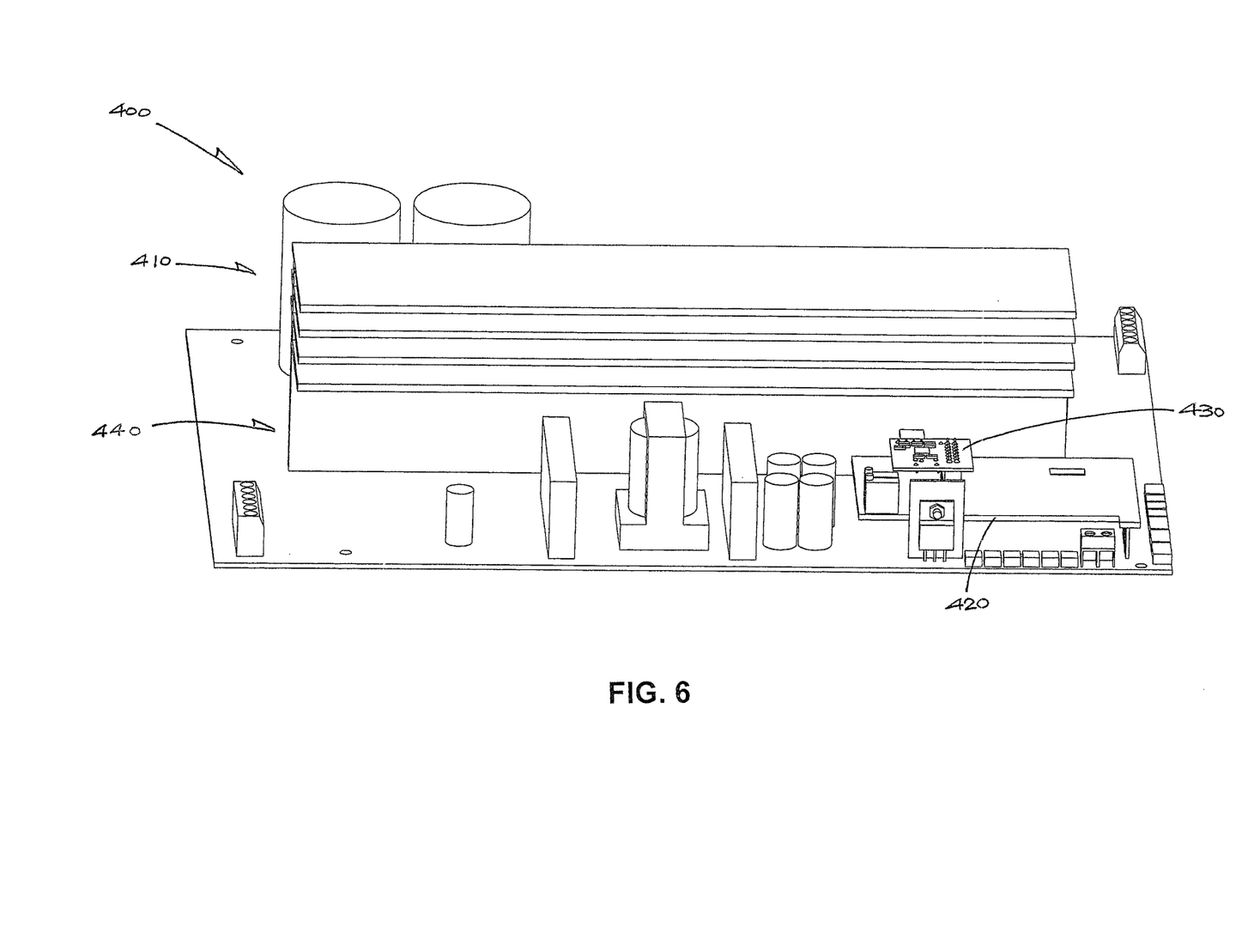
FIG. 6 is a schematic perspective view of the control circuit of FIG. 5.
Figure 7:
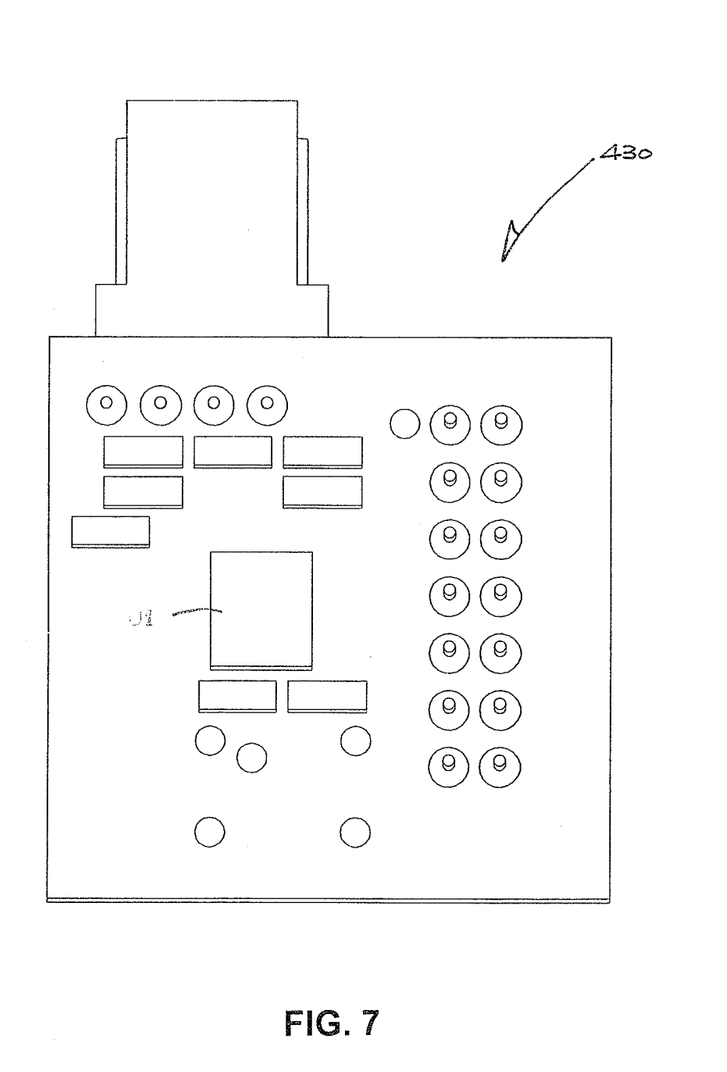
FIG. 7 is a schematic top view of a MCU circuit of the control circuit of FIG. 5.
Figure 8:
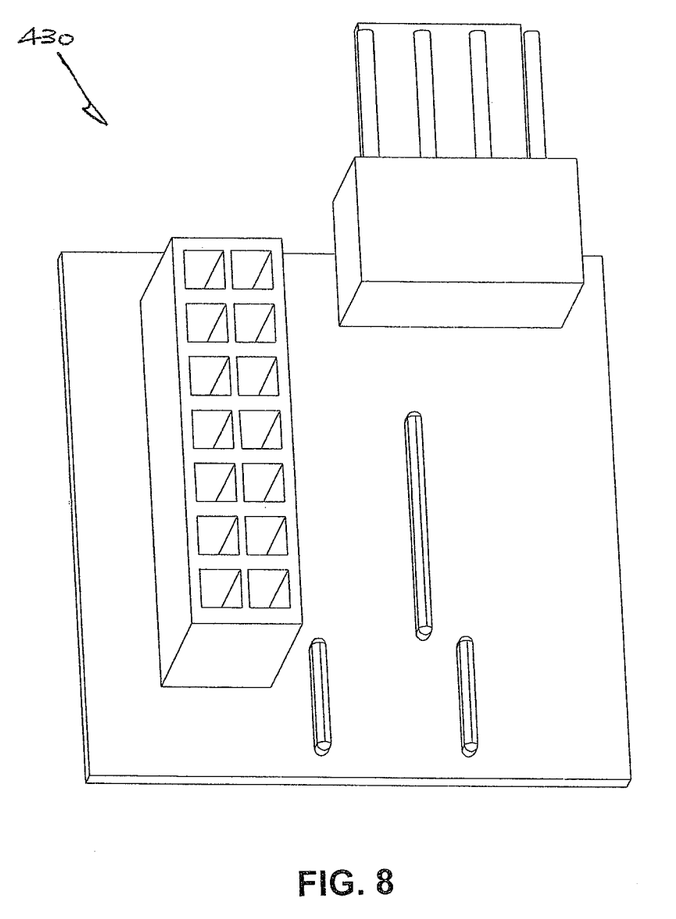
FIG. 8 is a schematic bottom view of the MCU circuit of FIG. 7.
Figure 9:
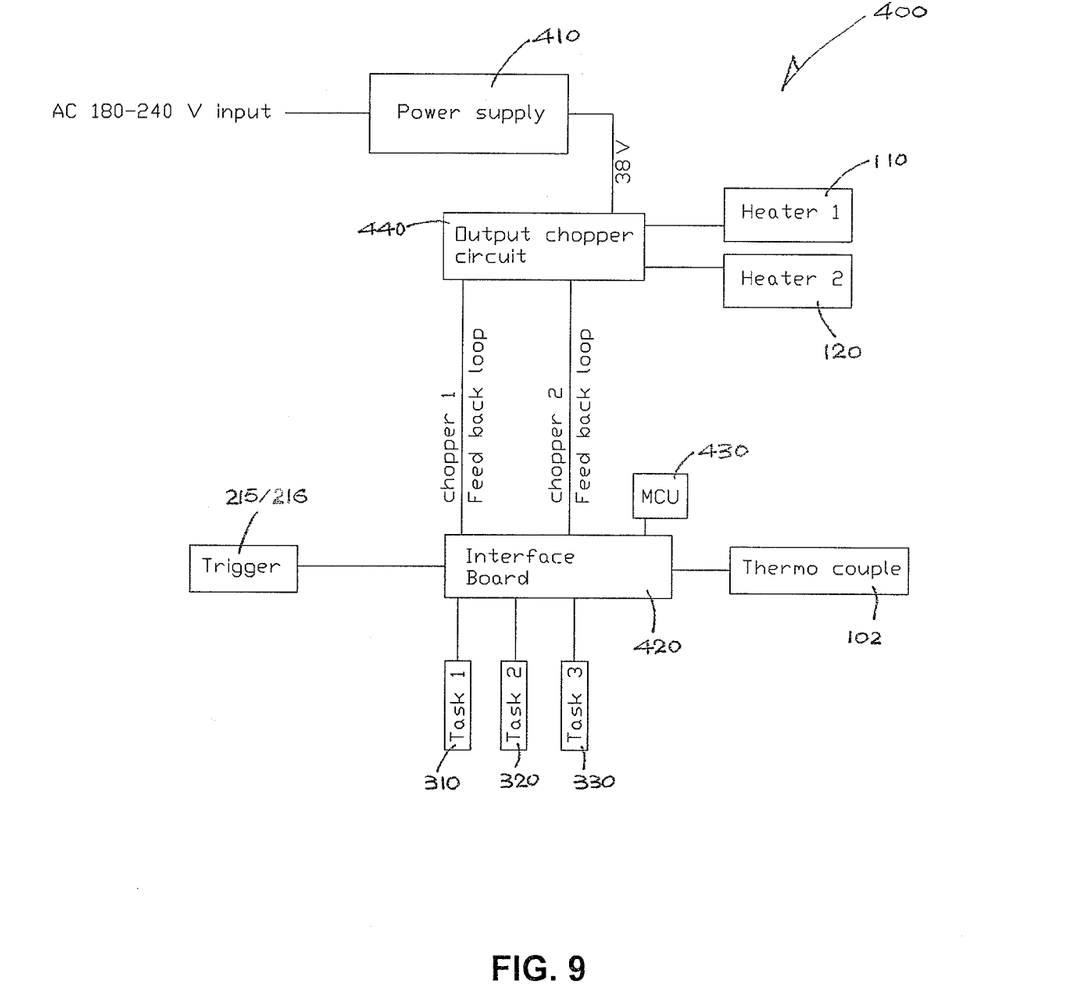
FIG. 9 is a functional block diagram of the control circuit of FIG. 5, being formed by a number of functional circuits.

The control buttons 310 to 330 are connected via a row of three electrical connectors 411, 412 and 413 along the left edge of the circuit board of the mains power supply circuit 410.

One or more thermocouples 102 may be used in the cooking chamber 100 at such a position or positions which are suitable for measuring and/or enabling calculation of the average temperature in the chamber 100. The average temperature is indicative of the body temperature of the food items 9 running in the chamber 100 before they are brought close to the heaters 110 and 120. The average temperature is used by the MCU U1 of the MCU circuit 430 as a reference to determine the electrical power (i.e. electrical current) that is required for driving the heaters 110 and 120 to provide the cooking power selected using the control buttons 310 to 330.

During normal continuous operation of the rotisserie oven 10 (or in particular the heaters 110 and 120), the average temperature of the cooking chamber 100 is designed to be around 320° C.

The toggle switch 215 is wired to the interface circuit 420 for controlling the time of operation of each of the heaters 110 and 120 i.e. the start and stop of operation. These are determined by reference to the moment when food enters into the cooking chamber 100, on the basis that the speed of operation/movement of the conveyer 130 is generally fixed as mentioned above.

Food is admitted into the cooking chamber 100 upon tilting of the fork plates 211 of the feeding station 210 by flipping the switch lever 216 upwards as described above, and this simultaneously closes the toggle switch 215. The switch 215 will only be closed momentarily as the fork plates 211 are spring-loaded to self return upon release.

The interface circuit 420 is configured to commence operation upon closing of the switch 215 as a trigger signal, whereupon the MCU U1 of the MCU circuit 430 commands an internal counter to count time for determining the start and stop times of the heaters 110 and 120 i.e. when the output chopper circuit 440 delivers DC power from the mains power supply circuit 410 to each of the heaters 110 and 120.

The start and stop times correspond to the moments when the food is brought close to and away from the heaters 110 and 120 one after the other, for cooking by the heaters 110 and 120 successively. This implies that the position of the food, or in general the angular position of the conveyer discs 131, relative to the heaters 110 and 120 is time dependent. The duration of cooking, i.e. the time interval between the start and sop times, is also dependent upon which of the control buttons 310 to 330 is pressed or the degree of cooking chosen by the user.

Figure 10:
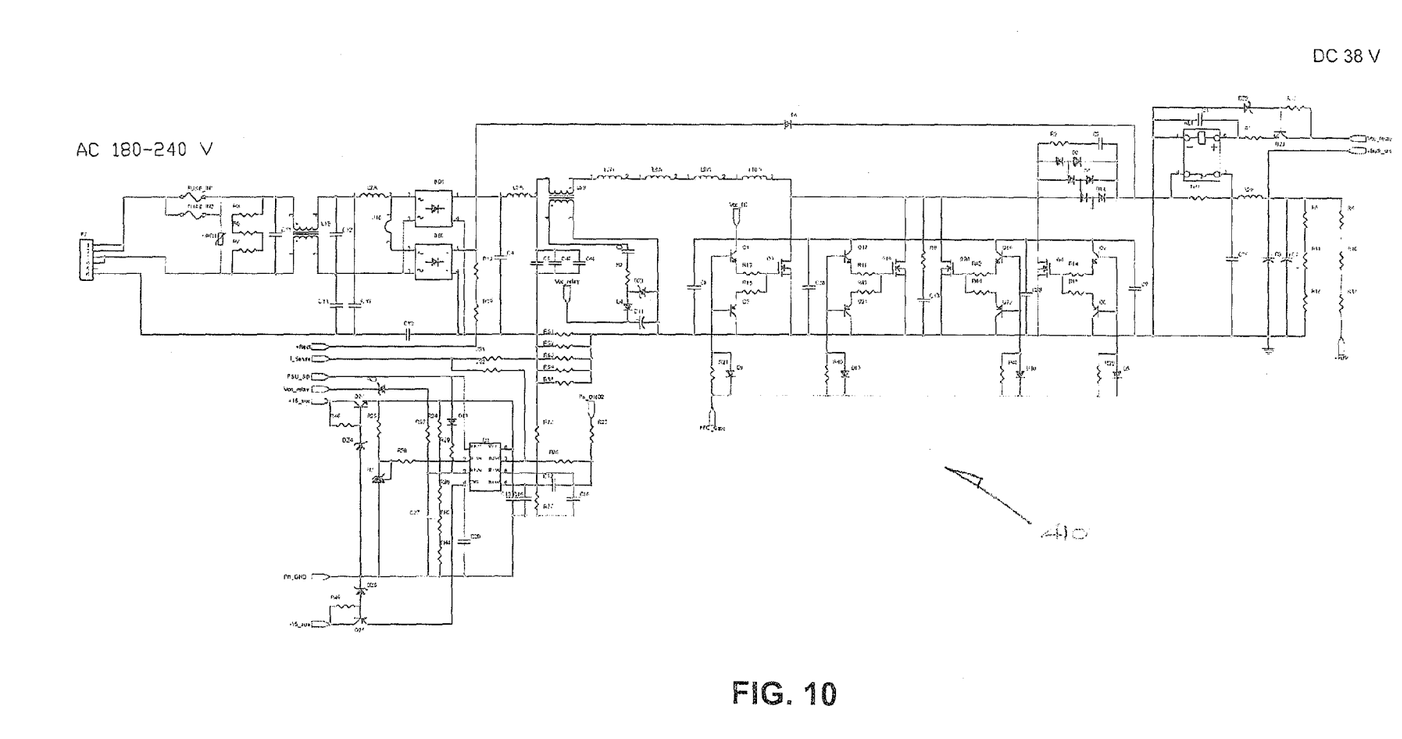
FIG. 10 is a circuit diagram of a mains power supply circuit of the control circuit of FIG. 9.
Figure 11:
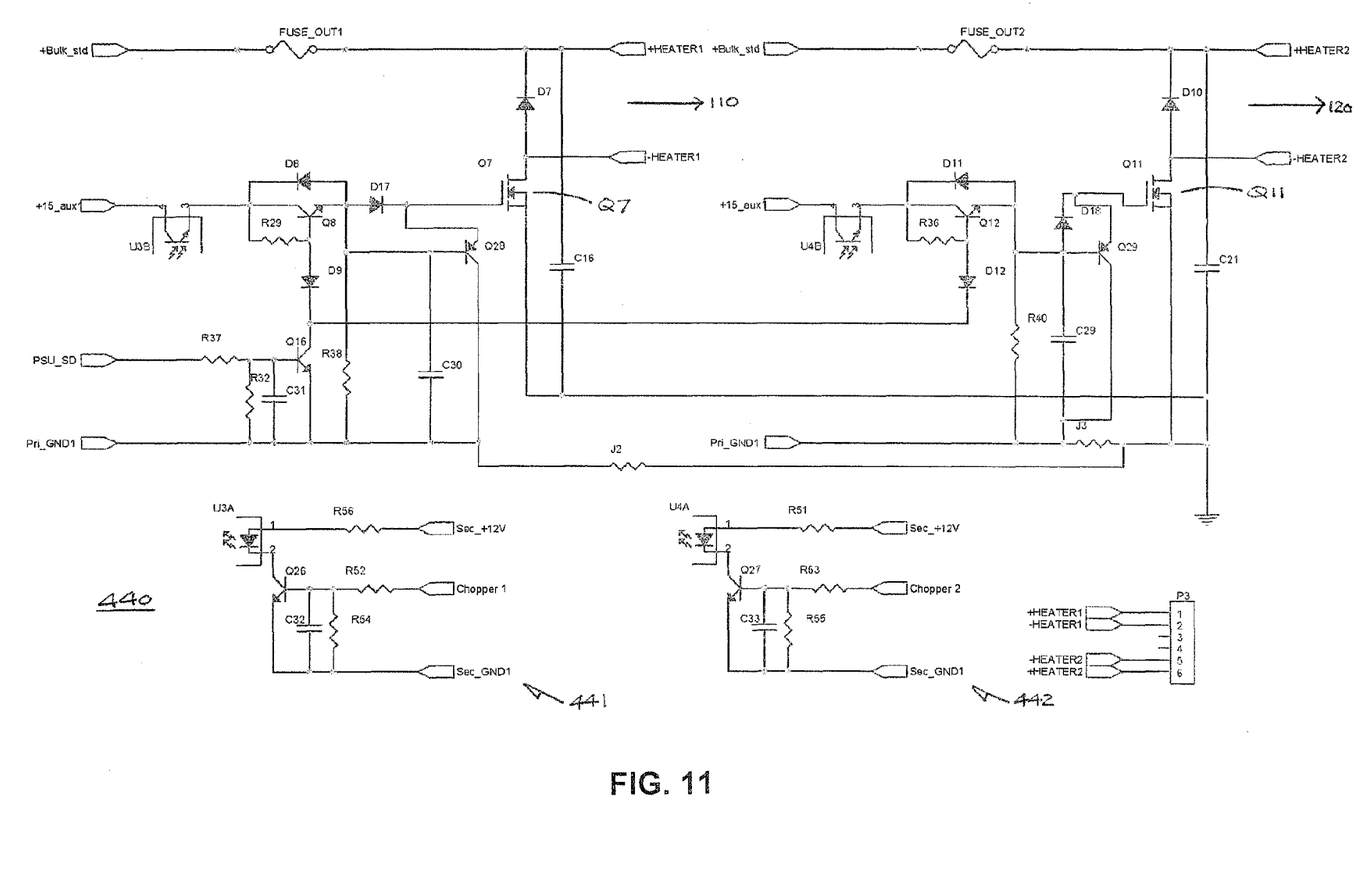
FIG. 11 is a circuit diagram of an output chopper circuit of the control circuit of FIG. 9.
Figure 12:
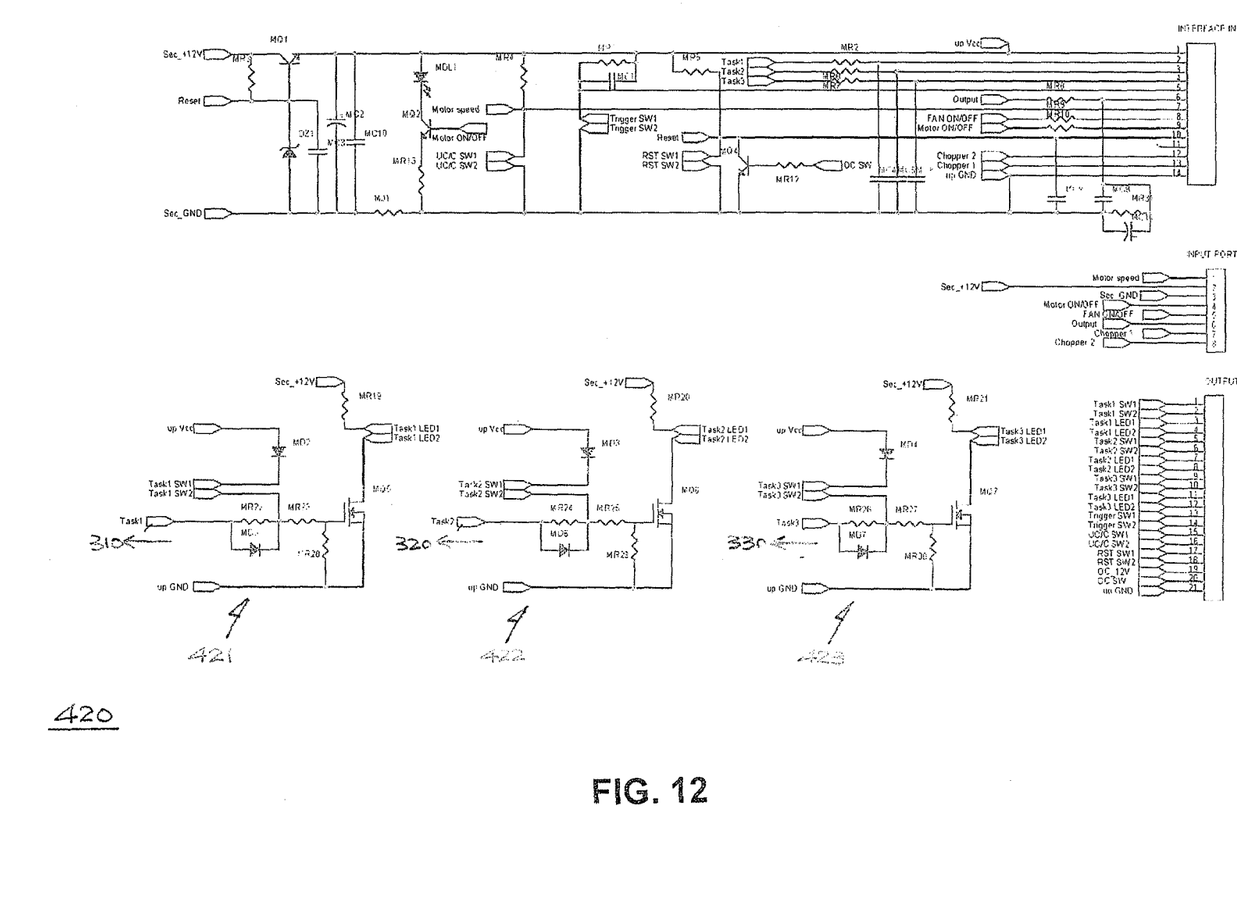
FIG. 12 is a circuit diagram of an interface circuit of the control circuit of FIG. 9.
Figure 13:
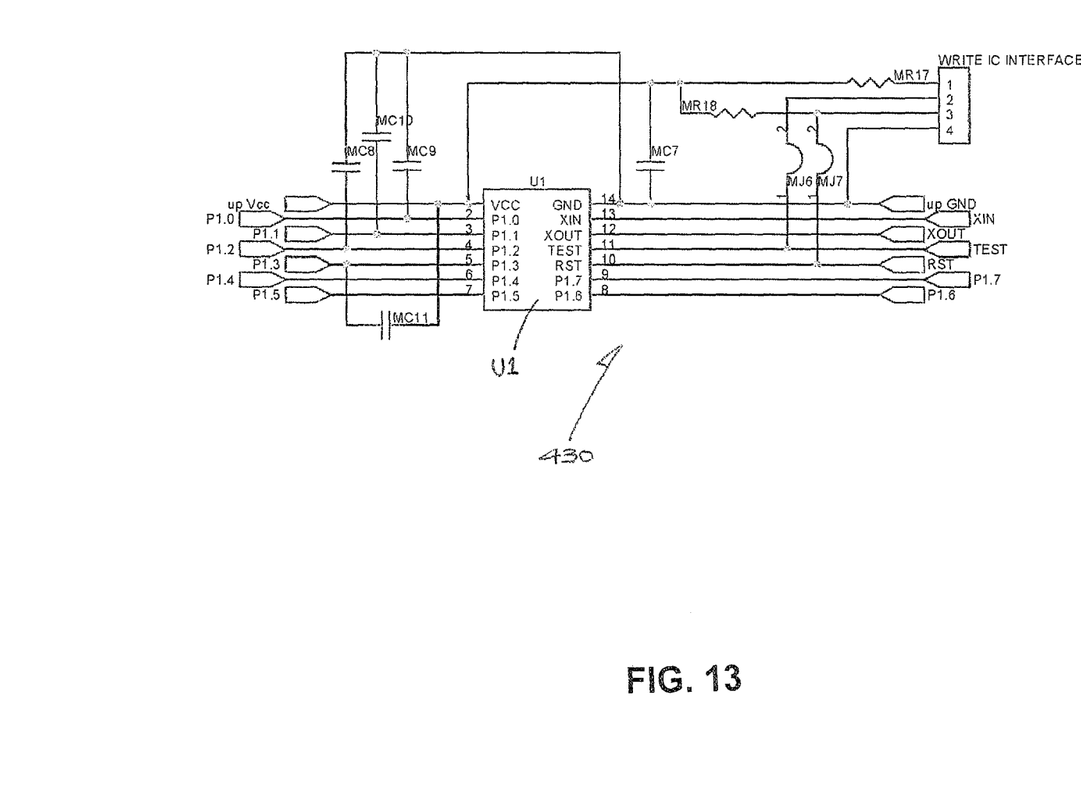
FIG. 13 is a circuit diagram of an MCU circuit of the control circuit of FIG. 9.

The mains power supply circuit 410 is effectively an AC to DC voltage regulator. The output chopper circuit 440 incorporates a pair of switching power transistors Q7 and Q11 for independently adjusting the rms value of the DC power from the mains power supply circuit 410 to the individual heaters 110 and 120. Also included is a pair of optionally isolated input circuits 441 and 442 for receiving respective 12V (low voltage) control signals from the interface circuit 420. As to the interface circuit 420, it includes three optionally isolated input circuits 421, 422 and 423 for receiving 12V control signals from the control buttons 310 to 330 respectively.

The basic circuit designs of the aforesaid circuits 410, 440 and 420, including their subsidiary circuits, and that of the MCU circuit 430, are generally known in the art and will not be described herein for clarity.

In operation, upon being unloaded from the feeding station 210 as an upcoming pair of pegs 132 arrives, first food item, e.g. a chicken wing 9 on a skewer, will be held by the said pegs 132 and then slowly turned upwards towards the first heater 110. The next piece of food item, e.g. a sausage on a skewer, may subsequently be loaded onto the feeding station 210 for unloading into the cooking chamber 100, which will then be picked up by the next or a later pair of pegs 132.

According to the control button pressed e.g. the medium button 320 for the chicken wing, the first heater 110 will be energized at a medium power level (e.g. 1000 W) over the period during which the chicken wing passes by the first heater 110. As the chicken wing moves onto the second heater 120, the sausage may have been mounted and turned close to the first heater 110. At this moment, the second heater 120 will be energized at the same power level of 1000 W as already selected for the chicken wing, whilst the first heater 110 will be energized at a different power level selected for the sausage, such as 800 W using the low button 310.

Accordingly, the power level of 1000 W will switch from the first heater 110 to the second heater 120 as the chicken wing turns from the first heater 110 to the second heater 120, whereby the chicken wing will be subject to the same cooking power level as selected by the user. At a later time, a different power level chosen to be 800 W will switch from the first heater 110 to the second heater 120 as the sausage turns close to them one after the other, such that the sausage will also be suitably cooked at a power level chosen independently.

The medium button 320 can of course be pressed if it is desired that the sausage be cooked more thoroughly, or the high button 330 for a more roasted chicken wing.

The operation described above is given on the assumption that the temperature of the cooking chamber 100 has remained generally unchanged, as would be the case for cooking food items one immediately after another, otherwise the operating power of the heaters 110 and 120 will be adjusted according to the chamber temperature measured by the thermocouple 102 as appropriate to achieve the desired cooking result.

The MCU U1 in the heater control circuit 400 is preferably programmed to include a table in its internal memory, which contains a set of data for controlling the operation of the heaters 110 and 120 at cooking powers corresponding to the control buttons 310 to 330 (to be selected by a user) and a range of possible temperatures of the chamber 100 (to be detected by the thermocouple 102).

It is envisaged that more than two heaters can be incorporated for a finer or more versatile control over the cooking temperature variation or distribution across the cooking chamber 100. More than two heaters, for example up to a series of four to six heaters, would be used in rotisserie ovens which are relatively larger and incorporate more than four, for example up to eight to twelve, food holders (e.g. the pegs 132 as described) for cooking more food articles at the same time by the respective heaters by which the food articles pass close.

It is also envisaged that instead of using skewers, different types of food holding devices can be used, such as a conveyor belt or an escalator.

The invention has been given by way of example only, and various other modifications of and/or alterations to the described embodiment may be made by persons skilled in the art without departing from the scope of the invention as specified in the appended claim or as disclosed in the description above.

The invention claimed is:

1. A food cooking oven comprising:
 a cooking chamber having an entrance for receiving a food item to be cooked, on a skewer having ends protruding from the food item, and an exit for discharging the food item on the skewer after cooking of the food item in the cooking chamber;
 at least two heaters located in the cooking chamber for cooking food items on skewers in the cooking chamber;
 a control circuit for controlling operation of the heaters, individually, in terms of at least one of time of operation of the heaters and power supplied to the heaters;
 a conveyor apparatus located in the cooking chamber for conveying food items on skewers successively, from the entrance, past the heaters for cooking, and to the exit, wherein the conveyor apparatus includes
 first and second opposed, spaced apart discs commonly mounted concentrically on a rotating shaft,
 a plurality of first and second clamps, the first and second clamps being peripherally mounted on the first and second discs, respectively, wherein
  each first clamp is mounted on the first disc directly opposite a corresponding second clamp mounted on the second disc, and
  each clamp includes a leg pivotally mounted with respect to the respective disc and pivoting to an open position, which opens the clamp for receiving and releasing an end of a skewer, and to a closed position, which closes the clamp for clamping the end of a skewer,
 a transfer assembly for transferring a food item on a skewer at the entrance of the cooking chamber to a pair of the first and second clamps for clamping by the pair of clamps and conveying by the first and second discs through the cooking chamber and past the heaters, wherein the transfer assembly includes first rollers for opening the pair of clamps to receive the ends of the skewer, and
 a release assembly for opening the pair of clamps at the exit of the cooking chamber and releasing the ends of the skewer for discharging the food item on the skewer and the skewer from the cooking chamber after cooking of the food item, wherein the release assembly includes second rollers for opening the pair of clamps to release the ends of the skewer; and
 a user control device for entering a cooking control signal for the control circuit to control the heaters as the conveyer apparatus conveys food items on skewers past the heaters.

2. The food cooking oven as claimed in claim 1, wherein the control circuit is configured to control the operation of the heaters successively, in accordance with the cooking control signal from the user control device as a food item on a skewer is conveyed past each of the heaters.

3. The food cooking oven as claimed in claim 2, wherein the control of the operation of the heaters by the control circuit operatively and successively controls the operation of a first heater and a second heater of the heaters as a food item on a skewer is conveyed past the first and second heaters successively, in accordance with the cooking control signal from the user control device.

4. The food cooking oven as claimed in claim 3, wherein the control circuit operatively controls the operation of the first and second heaters, individually, at a power determined by the cooking control signal from the user control device.

5. The food cooking oven as claimed in claim 3, wherein the control circuit operatively controls the operation of the first and second heaters, individually, at a time of operation determined by when a food item on a skewer is conveyed past the respective first and second heaters.

6. The food cooking oven as claimed in claim 1, wherein the control circuit includes a temperature sensor for sensing temperature in the cooking chamber to determine power supplied to the heaters in accordance with the cooking control signal from the user control device.

7. The food cooking oven as claimed in claim 1, wherein the user control device comprises at least one switch for providing a plurality of cooking control signals.

8. The food cooking oven as claimed in claim 7, wherein the user control device comprises a plurality of switches, each switch being associated with a respective cooking control signal.

9. The food cooking oven as claimed in claim 1, wherein the transfer assembly comprises:
 a pair of pivotally mounted forked plates in the oven at the entrance of the cooking chamber for receiving the ends of a skewer, wherein the forked plates are biased to support the ends of a skewer within forks of the forked plates;
 a pair of turn plates including notches for receiving the ends of the skewers, from the forks of the forked plates upon pivoting of the forked plates toward the turn plates, wherein the turn plates are located, within the cooking oven, to pivot and deliver a skewer to a pair of the clamps that have been opened by the first rollers; and
 a lever for pivoting the forked plates toward the turn plates to deliver a food item and skewer from the forks of the forked plates to the notches of the turn plates.

10. The food cooking oven as claimed in claim 9, wherein the transfer assembly further comprises an electrical switch actuated by the lever, the electrical switch, upon actuation, starting operation of the conveyor apparatus and synchronization of the control circuit with the conveyor.

11. The food cooking oven as claimed in claim 1, wherein the leg of each of the first and second clamps is biased toward the closed position.

12. The food cooking oven as claimed in claim 1 further comprising:
- an electrical motor for rotating the first and second discs;
- a gear train mechanically coupling the electrical motor to the first and second discs; and
- gearwheels coupled to the gear train and on which respective first and second clamps are mounted for simultaneous rotation about respective axes so that the first and second clamps rotate about the axes while being conveyed by the first and second discs, in planetary motion.

* * * * *